July 25, 1961  R. E. HOLMAN, JR  2,993,708
TRAVERSE ROD AND METHOD OF MANUFACTURING SAME
Filed June 19, 1957  4 Sheets-Sheet 1
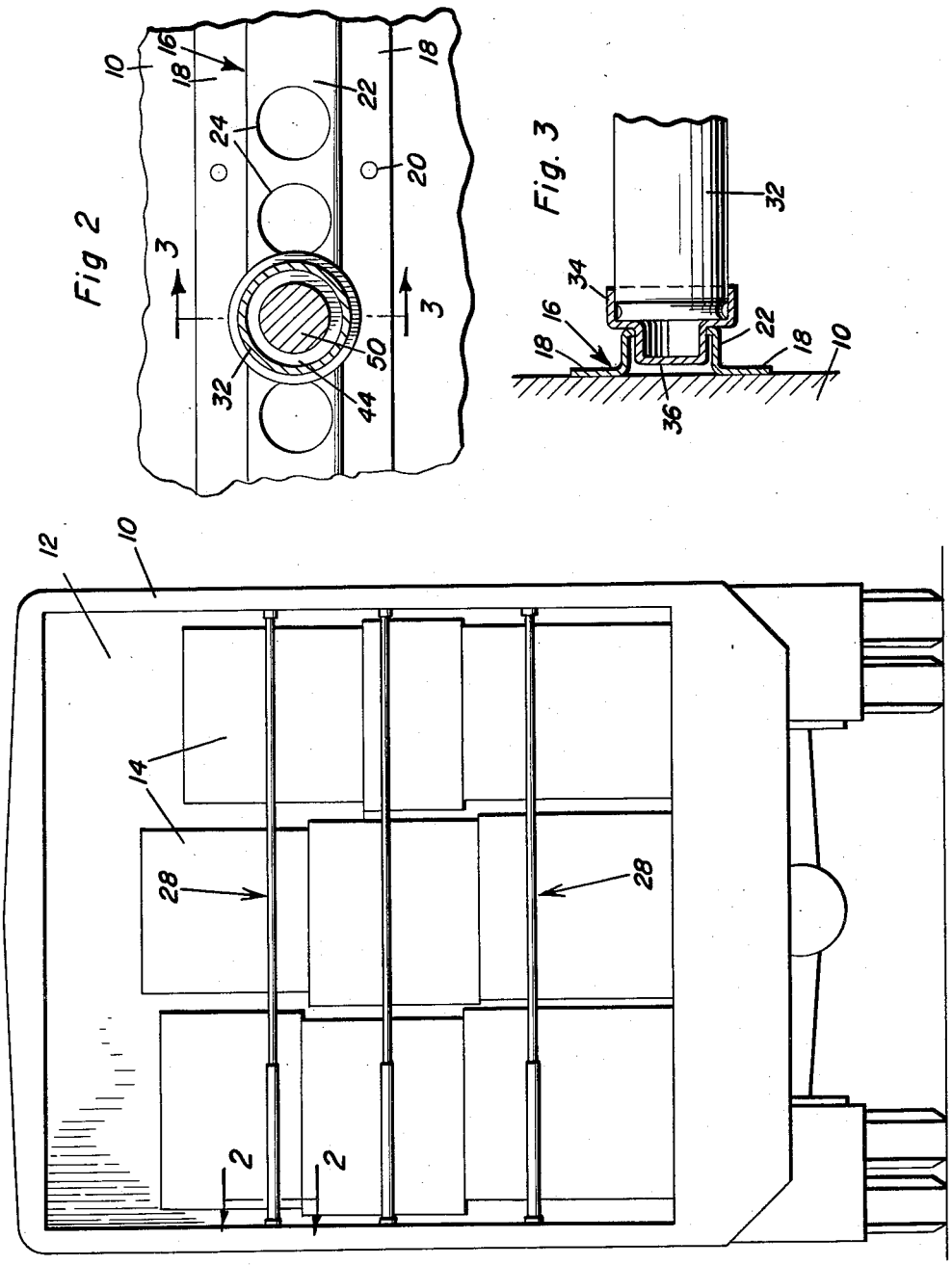
Robert E. Holman, Jr.
INVENTOR.

July 25, 1961 R. E. HOLMAN, JR 2,993,708
TRAVERSE ROD AND METHOD OF MANUFACTURING SAME
Filed June 19, 1957 4 Sheets-Sheet 2
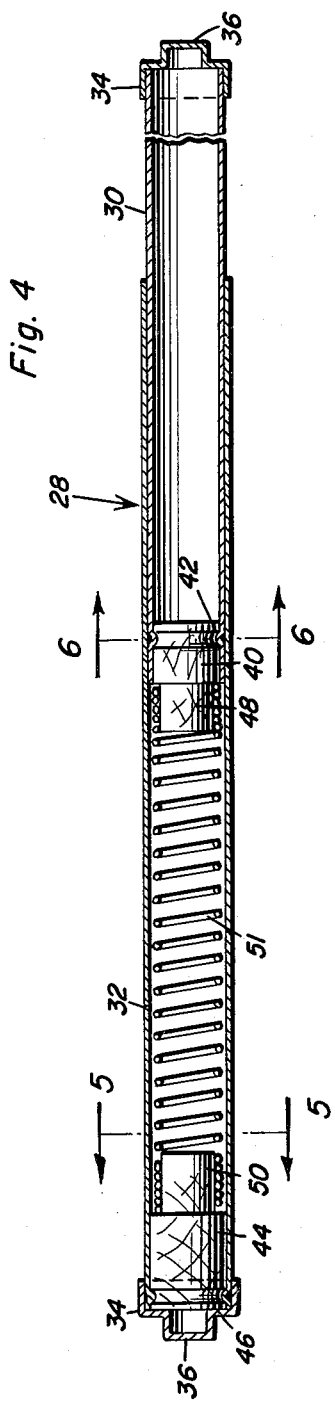
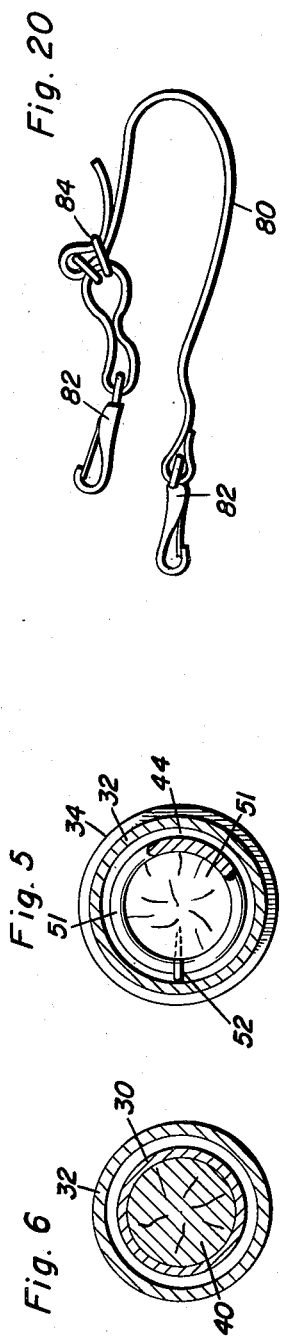
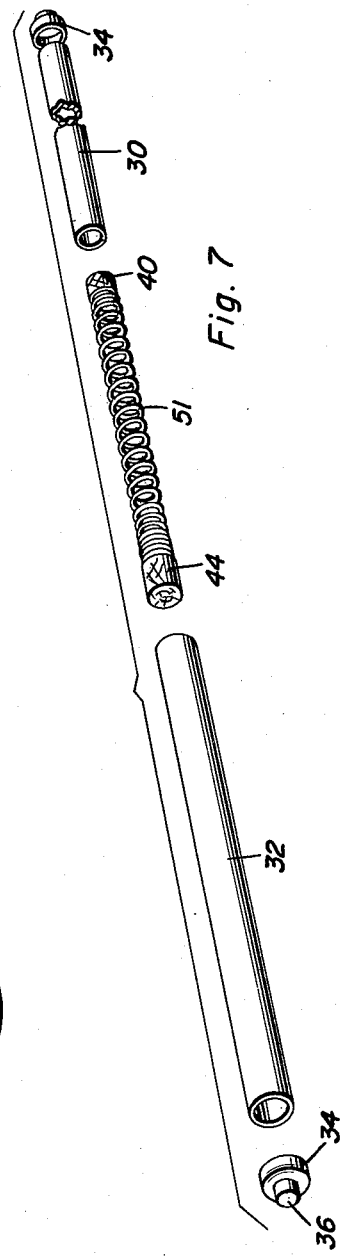
Robert E. Holman, Jr.
INVENTOR.

July 25, 1961   R. E. HOLMAN, JR   2,993,708
TRAVERSE ROD AND METHOD OF MANUFACTURING SAME
Filed June 19, 1957   4 Sheets-Sheet 3
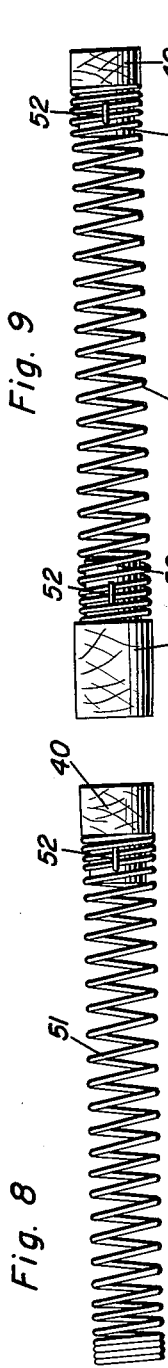
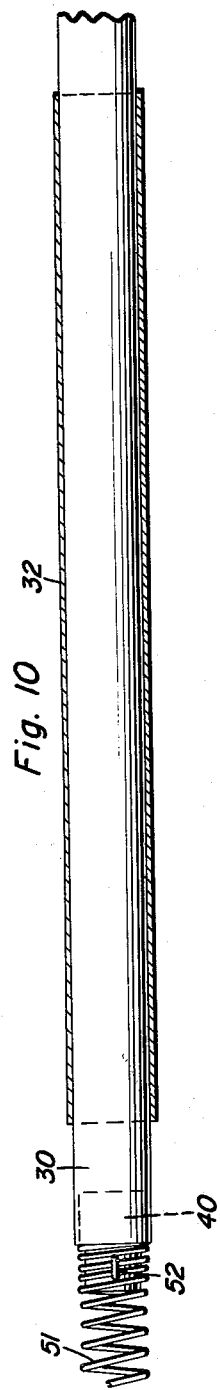
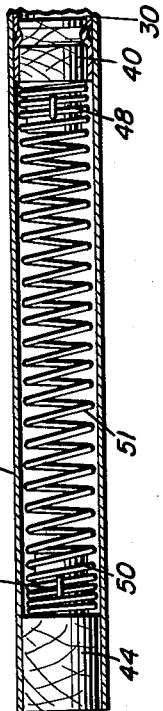
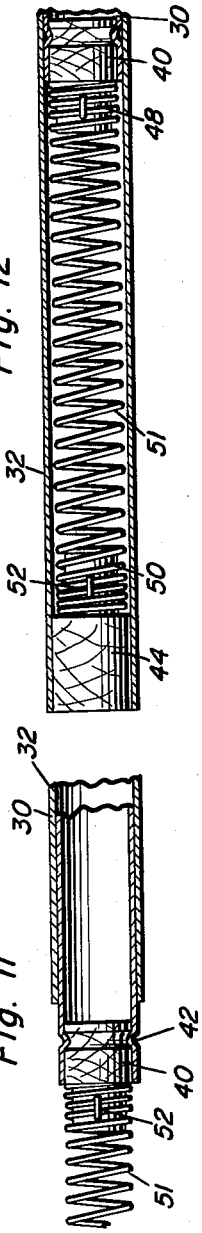
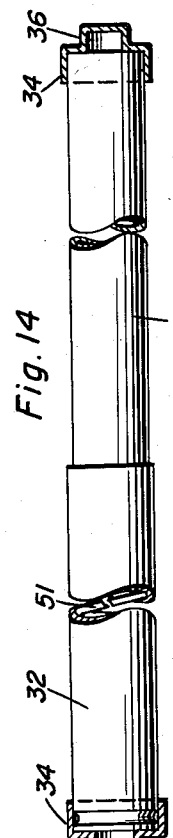
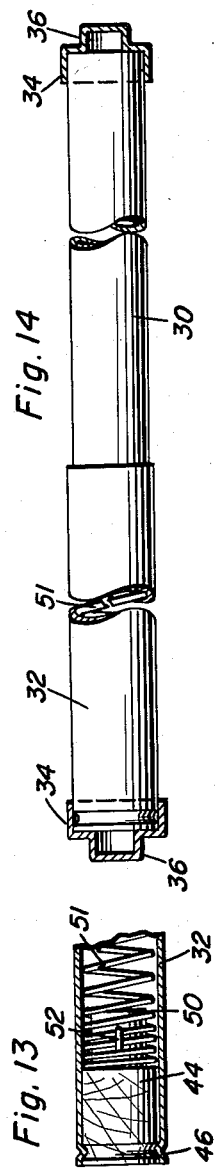
Robert E. Holman, Jr.
INVENTOR.
BY
Attorneys July 25, 1961 R. E. HOLMAN, JR 2,993,708
TRAVERSE ROD AND METHOD OF MANUFACTURING SAME
Filed June 19, 1957 4 Sheets-Sheet 4
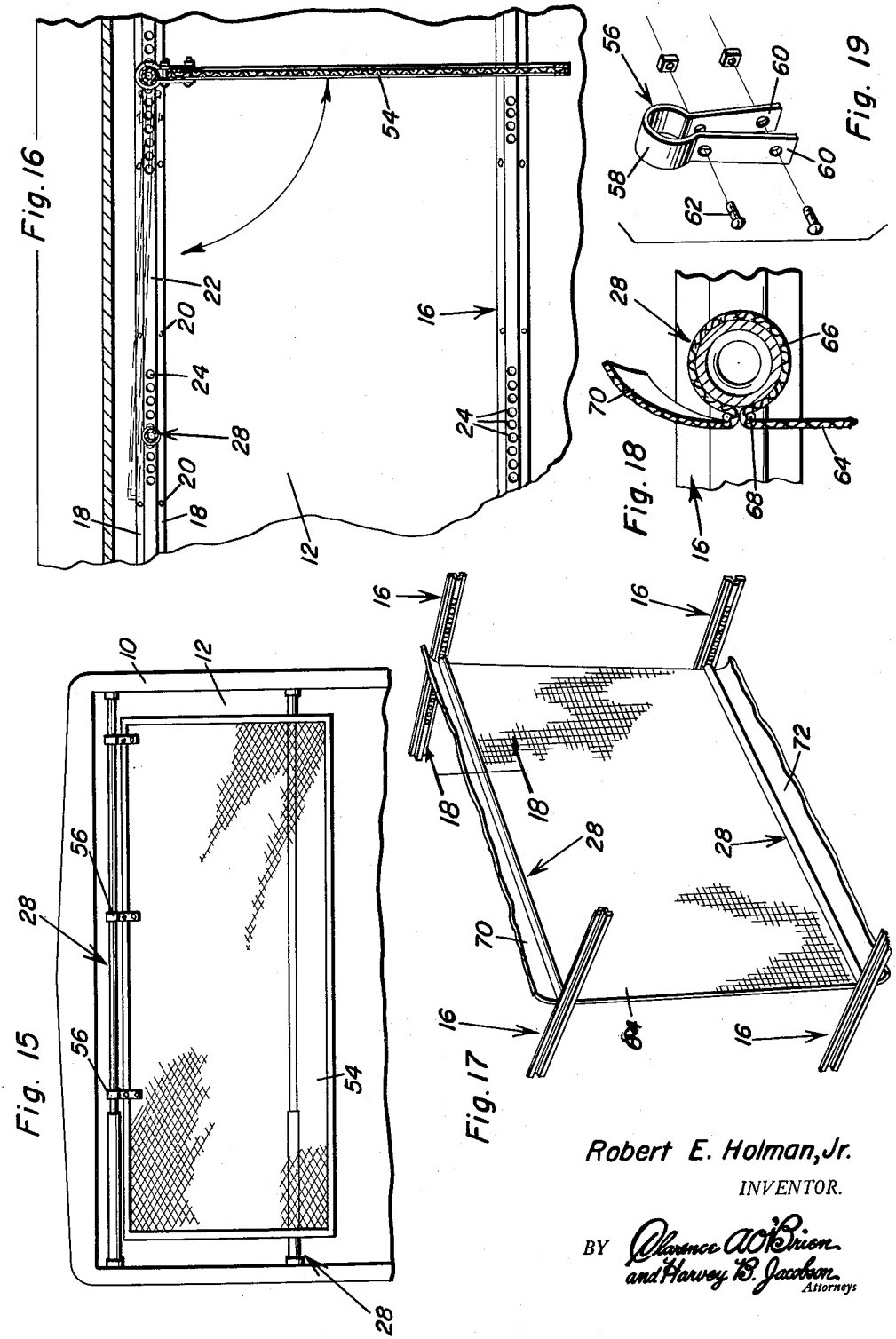
Robert E. Holman, Jr.
INVENTOR.

United States Patent Office 2,993,708
Patented July 25, 1961

2,993,708
TRAVERSE ROD AND METHOD OF MANU-
FACTURING SAME
Robert E. Holman, Jr., 2819 N. Western Ave.
Chicago, Ill.
Filed June 19, 1957, Ser. No. 666,701
4 Claims. (Cl. 280—179)

This invention comprises a novel and useful traverse rod and method of manufacturing the same and more particularly relates to a resiliently longitudinally extensible rod adapted for use as a cargo divider for trucks and the like, together with the method of making the rod and the method for using the same.

The principal object of this invention is to provide a method and means to divide a cargo space in a truck or the like more easily and effectively, and to retain portions of the cargo therein in a compact manner and segregated from other portions of the cargo.

A further object of the invention is to provide a means and a method in accordance with the foregoing object which will enable one portion of a cargo space to be effectively shut off from another portion thereof to thereby facilitate and improve the compact storage of a portion of a cargo in a portion of said space and the refrigeration of the same in a more economical manner.

A further object of the invention is to provide a means and method in accordance with the preceding objects which will be readily adjusted and adapted for assembly and positioning in various ways, whereby to enable cargoes of heterogeneous objects to be effectively stored and divided as desired.

A still further object of the invention is to provide in accordance with the preceding objects a cargo divider or separator rod which will have a highly satisfactory and serviceable, resilient, axial extensibility of the same to permit the divider or rod to be employed in cargo spaces of varying widths; and to permit the rod to be easily applied or removed in selected adjusted positions in the cargo space.

Yet another purpose of the invention is to provide a simple and practical method for assembling the various components of a cargo divider or separator rod having longitudinal resiliency thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a rear end elevational view of a cargo truck, showing the manner in which this invention is applied in the storage space thereof;

FIGURE 2 is a detailed view taken upon an enlarged scale and substantially upon the plane indicated by the section line 2—2 of FIGURE 1 and showing the manner in which one of the cargo dividers or separator rods is secured in adjusted position upon a support rail mounted at the side of the cargo space of the truck;

FIGURE 3 is a detailed view taken in vertical section substantially upon the plane indicated by the section line 3—3 of FIGURE 2 and showing the manner in which one end of the divider or separator rod is mounted in the support rail;

FIGURE 4 is a view in vertical, central, longitudinal section, parts being broken away, of a cargo divider or separator rod in accordance with this invention and showing the components of the same;

FIGURES 5 and 6 are vertical, transverse, sectional detailed views taken substantially upon the planes indicated by the section lines 5—5 and 6—6, respectively, of FIGURE 4;

FIGURE 7 is an exploded perspective view of the various elements forming the rod of FIGURE 4, parts being broken away;

FIGURES 8–14 are views illustrating sequential steps in the operation of assembling the components of the longitudinal extensible cargo divider or separator rod in accordance with this invention;

FIGURE 15 is an elevational view showing the manner in which a divider mat is secured in position in the cargo space by the divider or separator rod of this invention;

FIGURE 16 is a view similar to FIGURE 15, but taken at right angles thereto and showing in full lines the divider mat in its operative position and in dotted lines showing the manner in which the mat is stored in a raised, out-of-the-way position;

FIGURE 17 is a view in perspective showing the manner in which the divider mat is adjustably secured at its upper and lower portions to the support rails;

FIGURE 18 is a detailed view taken substantially upon the plane indicated by the section line 18—18 of FIGURE 17, in vertical section, and showing the manner in which the divider mat is secured to a cargo divider or separator rod;

FIGURE 19 is an exploded, perspective view of a hinged fastener by which the mat is secured in pivotal relation to a divider or separator rod; and FIGURE 20 is a view of a side-tie snap strap forming an element of this invention.

In FIGURE 1, the numeral 10 designates a truck or other vehicle having a cargo space 12 therein in which there are articles and objects 14 to be stored and maintained in a compact mass or group of separated masses for transportation purposes. In order to facilitate the adjustability of the article confining and separating means, the side walls of the truck or other vehicle containing the storage 12 are provided with a plurality of oppositely disposed pairs of horizontally and longitudinally extending support rails 16. These rails, as will be best apparent from FIGURES 2, 3, 16–18, comprise elongated channel members having out-turned parallel mounting flanges 18 by which the rails are secured to the side walls of the vehicle 10, as by screws 20 or other suitable means, together with a laterally projecting web 22 having a plurality of apertures 24 therein. The apertures serve to selectively receive the ends of a plurality of cargo dividers or separator rods, each designated generally by the numeral 28 and of a construction to be set forth hereinafter. The arrangement is such that a vertically extending layer or tier of the articles 14 may be packed against the front of the truck and may then be retained thereagainst by means of a set of the transversely extending divider or separator rods 28, in the manner suggested in FIGURE 1. Thereafter, additional tiers of articles may be likewise retained in a similar manner.

Reference is now made more particularly to FIGURES 4–7 for an understanding of the construction of a preferred embodiment of a cargo divider or separator rod 28. As shown in these figures, the rod comprises a pair of telescoping sleeves consisting of an inner sleeve 30 comprising the main section of the rod, together with an outer sleeve 32 slidable thereover. The two outer or opposite extremities of the two telescoping sleeves are provided with closure end caps, each designated by the numeral 34 and which caps are provided with a diametrically reduced, axially projecting extension 36, each being adapted to be inserted into and retained in an aperture 24 of a support rail 16 in the manner clearly shown in FIGURE 3. The two closure caps 34 are secured to the open ends of the sleeve sections of the rod in any suitable manner and constitute both a closure for the rod, as well as a means for mounting the rod in selected apertures in the support rails.

Rigidly secured in the open left-hand end of each of the sleeves is a cylindrical plug. The plug for the sleeve 30 is indicated by the numeral 40 and is pressed into the end of the sleeve and then is anchored therein in a rigid manner, as by forcing a radially inwardly projecting bead 42 in the material of the sleeve to cause the same to be depressed into and thus securely engage the circumference of the plug 40. In a similar manner, the plug 44 is secured in the left-hand end of the outer sleeve 32 by a similar inwardly depressed, circumferentially extending bead 46.

The two plugs are provided with diametrically reduced, axial extensions 48 and 50 which thus project towards each other within the outer sleeve 32 as best shown in FIGURE 4. A coil compression spring 51 has its opposite extremities seated upon the projections 48 and 50 of the closure plugs, and the spring suitably secured thereon as by a threaded engagement of the end coils of the springs upon these plugs and by the use of suitable staples or other fasteners 52, as shown more clearly in FIGURES 8–13. In this manner, the coil spring is fixedly secured to the two plugs and through the latter is also fixedly secured to the two sleeve portions 30 and 32 of the separator rod 28. This spring normally urges the rod sections away from each other, to thus longitudinally elongate the rod and cause the extremities 36 to be yieldingly engaged in and retained in the apertures of the selected support rails.

It will thus be seen that by virtue of the resiliency of the extensible rods that a single rod can be readily employed with different spacings of the support rails to thereby be accommodated for use in different sized vehicles or cargo spaces.

In some instances, the support rails and rods alone may be satisfactory for retaining selected portions of a cargo in its different positions in a cargo space, as shown in FIGURE 1. However, the invention further contemplates the utilization of a flexible mat as a flexible partition, curtain or separator to assist in retaining portions of a cargo and especially for retaining small articles and objects in a compactly stored condition. Referring specifically to FIGURES 15–19, it will be seen that a mat 54 is shown supported upon an upper separator rod 28 and, hanging from that rod, extends downwardly into the storage compartment from adjacent the roof thereof. This mat may be of any suitable material, as, for example, an expanded sheet metal lath, a wire screen, a suitable netting, or even a fabric sheet or the like. As will be readily understood, the resilient mat 54 may extend from adjacent the roof of the storage compartment 12 to hang at any desired position therein or even may reach to the floor if desired. It may also be mounted at different vertical positions in the compartment in order to best carry out its purpose of retaining objects and articles in the storage compartment at a predetermined position therein.

As will be seen from FIGURES 15 and 19, suitable clips designated generally by the numeral 56 are employed for securing the resilient mat pivotally to the separator rod 28. Conveniently, each of these clips may comprise a single strip of metal having an arcuate portion 58 adapted to embrace and pivot on the rod 28, with parallel depending arms 60 suitably apertured for the reception of fastening bolts 62. The depending arms embrace the mat therebetween and are secured to the mat, as by the bolts, whereby the mat is mounted for pivotal movement upon its supporting separator rod.

It is further possible to provide a mat construction of the type shown in FIGURES 17 and 18. Here there is disclosed a mat 64 which as in the preceding embodiment may be of any desired construction. However, in this form, the mat is secured adjacent its upper and lower portions to a pair of the separator rods 28, whereby the mat may be mounted between upper and lower pairs of support rails and thus may serve to transversely divide any selected vertical portion of the storage chamber or may divide the entire vertical height and transverse width of the same, as by a partition.

For this purpose, as shown in FIGURE 18, the material of the mat is formed in a transverse loop 66, see FIGURE 18, being retained thereon as by clips or the like 68. There is thus provided an upstanding scalloped portion or valance 70 which may brush against the top surface of the storage compartment, while beneath the lower rod 28 the flexible mat is provided with a depending skirt or valance 72 for engagement with the floor. This construction possesses a particular advantage in that it establishes a complete curtain or partition across the interior of the storage compartment. Consequently, when the objects are retained at the front end of the storage compartment, as in a refrigerated truck or the like, the flexible mat 64 will serve to confine the refrigerated air to that compartment, thus greatly decreasing the amount of refrigeration required for the contents in the truck and rendering it easier to restore the desired refrigerated atmosphere to the cargo portion of the truck when it is necessary to open the truck to remove articles therefrom.

As shown in FIGURE 16, the mat 54 previously mentioned may be swung from its full line operative position to its dotted line position adjacent the top of the compartment and retained therein as by the divider rod 28 when the services of the mat are no longer desired.

The present invention further envisions and comprehends a novel and advantageous method for assembling the longitudinally extensible and resilient separator rod 28. Referring now to the views of FIGURES 8–14, the steps of the preferred method of assembly are as follows:

The spiral compression coil spring 51, as shown in FIGURES 8 and 9, is first threaded at one end upon the smaller of the retaining plugs 40, the coils being either screw threadedly engaged on the extension 48 of this plug or pressed tightly thereon. Thereafter, the staple or other fastener 52 is applied to rigidly secure this end of the spring to the plug. This step is illustrated in FIGURE 8.

Next, the other end of the spring is secured to the other plug 44 in a similar manner, as illustrated in FIGURE 9. Thereafter, the two sleeves 30 and 32 are raised in concentric relation, as shown in FIGURE 10, with the inner sleeve being projected slightly beyond the outer sleeve, in order that the smaller plug 40 may be inserted into the open extended end of the inner sleeve. This step is shown in FIGURE 10.

Next, the material at the extended end of the inner sleeve is depressed or rolled inwardly to form a circumferentially extending, inwardly projecting rib or bead 42 which is thus deformed into the material of the plug 40 and thus securely locks the plug into the end of the inner sleeve, this step being clearly brought out in FIGURE 11.

Next, the outer sleeve 32 is extended beyond the inner sleeve, over the spring 51, and the larger plug 44 is then forced into the forwardly projected end of the outer sleeve, as shown in FIGURE 12. Thereafter, the bead 46 is formed upon the outer sleeve to thereby firmly lock the open end of the outer sleeve upon the plug 44 received therein. Next, the two end caps 34 are applied to the opposite ends of the two sleeves as shown in FIGURE 14 and the cargo divider or separator rod is now complete.

Shown in FIGURE 20 is a tie strap which may be advantageously employed for securing an article or group of articles securely to one of the support rails 16, to a separator rod or for other purposes. The tie strap comprises a flexible band or strap 80 of any suitable material and length and having snap hooks 82 at its ends together with a conventional length adjusting means 84 adjacent one of the hooks.

The strap is utilized by engaging the same upon or about an article or articles and securing the snap hooks to a support, such as to the support rail 16, see FIGURE 2, or about a support rod 28. When not in use, the strap may be hung by its snap hooks to a support rail 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A longitudinally extensible and resilient divider rod comprising a pair of telescoping open ended metallic sleeves, each sleeve having a plug secured in an end portion thereof, each sleeve having a portion thereof deflected inwardly to provide thereby an inwardly projecting annular rib seated in a complementary annular peripheral channel in the corresponding plug, caps on the opposite ends of said sleeves closing the latter, the annular rib on the outer sleeve being encircled by and confined in one of said caps whereby to retain the rib in said channel, the rib of the inner sleeve being retained in the channel of the other plug by the sliding embracement of the inner sleeve by the outer sleeve, said plugs having diametrically reduced end portions projecting towards each other, a compression spring in said rod having its ends embracing and secured to said reduced end portions and yieldingly urging said sleeves into longitudinally extended positions.

2. The combination of claim 1 wherein said caps have outwardly projecting, diametrically reduced tubular axial extensions comprising axles for supporting said rods.

3. The combination of claim 1 wherein said reduced end portion of the plug in the inner sleeve projects outwardly beyond the latter and into the outer sleeve.

4. The combination of claim 1 wherein said plugs are non-metallic whereby the material of the sleeve rib may be displaced into the channel of the plug.

References Cited in the file of this patent

UNITED STATES PATENTS

| | | |
|---|---|---|
| 860,348 | Brayton | July 16, 1907 |
| 961,352 | Walters | June 14, 1910 |
| 2,160,870 | Jones | June 6, 1939 |
| 2,411,768 | Welch | Nov. 26, 1946 |
| 2,519,996 | Blake | Aug. 22, 1950 |
| 2,565,997 | Stone | Aug. 28, 1951 |
| 2,608,420 | Eck | Aug. 26, 1952 |
| 2,659,319 | Herman | Nov. 17, 1953 |

FOREIGN PATENTS

| | | |
|---|---|---|
| 242,551 | Great Britain | Nov. 12, 1925 |
| 212,613 | Switzerland | Mar. 3, 1941 |